(12) United States Patent
Mohammed

(10) Patent No.: US 8,073,469 B2
(45) Date of Patent: *Dec. 6, 2011

(54) PAGING FOR NON-REAL-TIME COMMUNICATIONS WIRELESS NETWORKS

(75) Inventor: Jahangir Mohammed, Santa Clara, CA (US)

(73) Assignee: Jasper Wireless, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/047,354

(22) Filed: Jan. 31, 2005

(65) Prior Publication Data

US 2006/0172747 A1 Aug. 3, 2006

(51) Int. Cl.
*H04W 68/00* (2009.01)
(52) U.S. Cl. ........................ 455/458; 455/574
(58) Field of Classification Search .......... 455/458, 455/574, 434
See application file for complete search history.

(56) References Cited

U.S. PATENT DOCUMENTS

| | | | |
|---|---|---|---|
| 5,301,225 A | | 4/1994 | Suzuki et al. |
| 5,420,911 A * | | 5/1995 | Dahlin et al. ............ 455/553.1 |
| 5,539,748 A | | 7/1996 | Raith |
| 5,604,744 A | | 2/1997 | Andersson et al. |
| 5,627,882 A | | 5/1997 | Chien et al. |
| 5,809,421 A * | | 9/1998 | Manssen et al. ............ 455/434 |
| 5,884,196 A | | 3/1999 | Lekven et al. |
| 6,021,122 A * | | 2/2000 | Tiedemann, Jr. ............ 370/331 |
| 6,078,819 A | | 6/2000 | Ciccone et al. |
| 6,289,227 B1 * | | 9/2001 | Shi ............................. 455/574 |
| 6,480,504 B1 * | | 11/2002 | Wang et al. .................. 370/442 |
| 6,542,743 B1 | | 4/2003 | Soliman |
| 6,650,912 B2 * | | 11/2003 | Chen et al. .................. 455/574 |
| 6,799,030 B2 | | 9/2004 | Barber et al. |
| 6,823,192 B2 * | | 11/2004 | Jou et al. ..................... 455/458 |
| 6,947,405 B2 * | | 9/2005 | Pitcher et al. ............... 370/338 |
| 7,034,853 B2 * | | 4/2006 | Cho et al. .................... 345/903 |
| 2001/0015963 A1 * | | 8/2001 | Tuomainen et al. ......... 370/311 |
| 2002/0082010 A1 * | | 6/2002 | Koorapaty et al. .......... 455/434 |
| 2004/0063442 A1 * | | 4/2004 | Goldberg .................... 455/458 |
| 2004/0152475 A1 * | | 8/2004 | Kim ............................. 455/458 |
| 2004/0209628 A1 * | | 10/2004 | Laroia et al. ................ 455/458 |
| 2004/0229605 A1 * | | 11/2004 | Hwang et al. ............ 455/426.1 |
| 2004/0254980 A1 * | | 12/2004 | Motegi et al. ................ 709/203 |
| 2005/0148348 A1 | | 7/2005 | Cramby et al. |
| 2006/0148493 A1 | | 7/2006 | Narasimha et al. |

OTHER PUBLICATIONS

ETSI Standard 03.60 Digital Cellular Telecommunication Systems (Phase 2+); General Packet Radio Service (GPRS) Service description, Stage 2 (GSM 03.60 version 7.4.1 Release 1998).

(Continued)

*Primary Examiner* — Charles Appiah
*Assistant Examiner* — Jaime Holliday
(74) *Attorney, Agent, or Firm* — Blakely Sokoloff Taylor & Zafman, LLP

(57) ABSTRACT

Improvements for paging in wireless networks is disclosed. A wireless terminal clock is synchronized to a server clock and a paging window and a dormant window are derived for communicating between the server and the wireless terminal using the synchronized time. During the paging window a control channel for a cellular network is found by the wireless terminal; and the page may be received from the server at the wireless terminal.

26 Claims, 5 Drawing Sheets

OTHER PUBLICATIONS

ETSI Standard 04.08 Digital CellularTelecommunication Systems (Phase 2+); Mobile Radio Interface Layer 3 Specification, pp. 1-172. (GSM 04.08 version 7.4.2 Release 1998).

ETSI Standard 03.13 Digital Cellular telecommunication systems (Phase 2+); Discontinuous Reception (DRX) in the GSM System (GSM 03.13 version 8.0.0 Release 1999).

ETSI Standard 05.02 $3^{rd}$ Generation Partnership Project; Technical Specification Group GSM/EDGE Radio Access Network; Multiplexing and Multiple Access on the Radio Path (Release 1999).

Peter H Dana, Department of Geography, University of Texas at Austin. Global Positioning System Overview; http://uregina.ca/~sauchyn/geog411/global_positioning_systems.html.

* cited by examiner

T1P = Tier-2 period
T2P = Tier-1 period
TID = Wireless Terminal unique ID number
TSEC = Current Time in seconds computed as:
    HH*60*60+MM*60+SS
        Where: HH is hours (0 to 23)
               MM is minutes (0 to 59)
               SS is seconds (0 to 59)
mod = "modulo" operation

PAGING FOR NON-REAL-TIME COMMUNICATIONS WIRELESS NETWORKS

FIELD OF THE INVENTION

The present invention relates to non-real-time communication with Wireless Terminals via cellular network such as GSM/GPRS/EDGE or CDMA or WCDMA. More specifically, the present invention relates to a novel and improved system and method of paging for substantially reducing the power consumption of Wireless Terminals during standby mode when used for non-real-time communications and operating via cellular networks

BACKGROUND OF THE INVENTION

The cellular system was primarily designed to deliver voice and data services to the users. Users require real-time responses—that is, when a far end user calls a Wireless Terminal, they expect the Wireless Terminal to ring within seconds. The cellular system is designed to meet this need by having the Wireless Terminal look for pages frequently (once every second or so). Cellular networks send pages for specific Wireless Terminals in specific frames, and Wireless Terminals wake-up only during that specific frame to look for this page and sleep rest of the time. (A page is an indication from the cellular network to the Wireless Terminal that someone wants to communicate with it; A page is typically followed by the establishment of a communication session). The cellular network does require the Wireless Terminal to wakeup frequently, every second or so, in order to meet the real-time requirements of the user. This consumes substantial battery power at the Wireless Terminal. In today's cellular network, a typical Wireless Terminal in standby mode (that is when merely listening for pages and not having any data or voice communication sessions) depletes the battery within a few days to a couple of weeks depending on the particulars of the Wireless Terminal.

However, there are also a number of applications that can use the cellular network that do not require a real-time response; it is okay for the far end to reach the Wireless Terminals within minutes or hours rather than seconds (referred to hereafter as non-real-time communication). For example, a machine manufacturer may want to download new data into a machine in the field occasionally, where it is sufficient for this new data to reach the machine within an hour. Or as another example, a courier may want to periodically track the location of a piece of cargo which has a GPS location device and Wireless Terminal, etc. There is significant value in increasing the battery life of Wireless Terminals for such applications by leveraging the fact that this type of communication does not require a real-time response. But, requiring changes to existing cellular network paging methods only for these non-real-time applications is very expensive and impractical. There is significant value if paging methods could be devised which can substantially increase the battery life of Wireless Terminals without imposing changes on the existing cellular network

BRIEF DESCRIPTION OF THE DRAWINGS

Various embodiments of the invention are disclosed in the following detailed description and the accompanying drawings.

DETAILED DESCRIPTION

Figure 1:
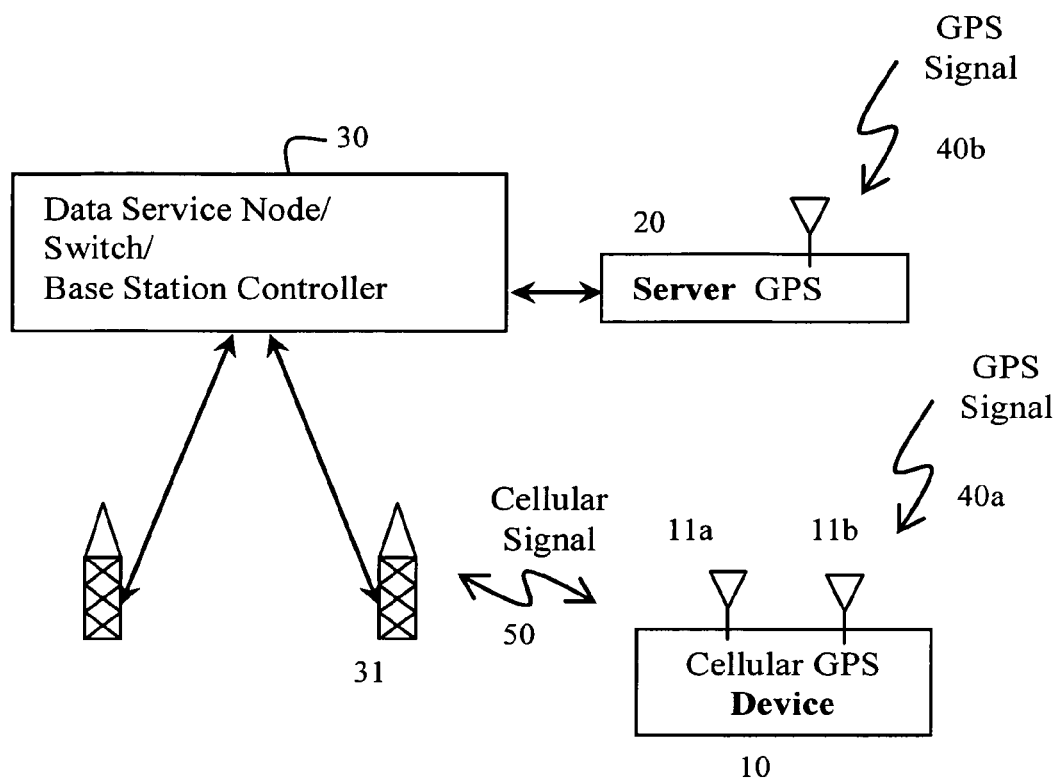
FIG. 1 illustrates an embodiment of a non-real-time communication system via cellular network.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Wireless Terminals operating in cellular networks exist in two modes: standby mode and traffic mode. When the Wireless Terminal does not have an active communication session and is merely monitoring for pages destined for it from the cellular network, it is said to be in standby mode. When the Wireless Terminal is in an active voice or data session with the far end, it said to be in traffic mode.

One of the salient aspects of standby mode is that the Wireless Terminal needs to listen for page for only a short duration about every a second or so. This allows the Wireless Terminal to disable most of its circuitry when it is not listening for a page and hence conserve battery power.

Below is an overview description of the paging method used in the most prevalent cellular system in the world, GSM/GPRS cellular system. Very detailed descriptions of paging methods used in this system are found in standards:

1. ETSI Standard 03.13 Digital Cellular telecommunication systems (phase 2+); Discontinuous reception in GSM System (GSM 03.13 version 8.0.0 Release 1999);
2. ETSI Standard 03.50 General Packet Radio Service (GPRS) Service description, Stage 2 (GSM ETSI Standard);

3. ETSI Standard 04.08 3$^{rd}$ Generation Partnership Project; Technical Specification Group Core Network; Mobile Radio Interface Layer 3 Specification (Release 1999); and 4. ETSI Standard 05.02 3$^{rd}$ Generation Partnership Project; Technical Specification Group GSM/EDGE Radio Access Network; Multiplexing and Multiple Access on the Radio Path (Release 1999);

which are herein incorporated for all purposes. The GSM/GPRS system is used here as an example. The method described here is representative of current art in cellular systems in general. The methods employed in other popular cellular systems, such as CDMA and WCDMA are very similar.

The basic principle used in paging methods is that the system ensures the Wireless Terminal is aware of exactly when page requests for it may be transmitted by the cellular network so that it can then schedule other tasks or sleep during the rest of the period during which cellular network is not sending a page for that Wireless Terminal.

The technique works by dividing the Wireless Terminals within a cell into a set of groups. The group in which a Wireless Terminal resides is then known locally at both the Wireless Terminal and the cellular network. All paging requests to each group are then scheduled and sent at a particular time, which is derived from the Frame Number in conjunction with the Wireless Terminal Identification number and some broadcasted Parameter from the Cellular Network.

Thus, both the Cellular Network and the Wireless Terminal know when relevant page requests will be sent, and the Wireless Terminal can power down parts of its circuitry for the period when it knows that page requests will not occur. Note that any page request from the Cellular Network contains the Wireless Terminal Identification Number for which the page is destined.

Figure 3:
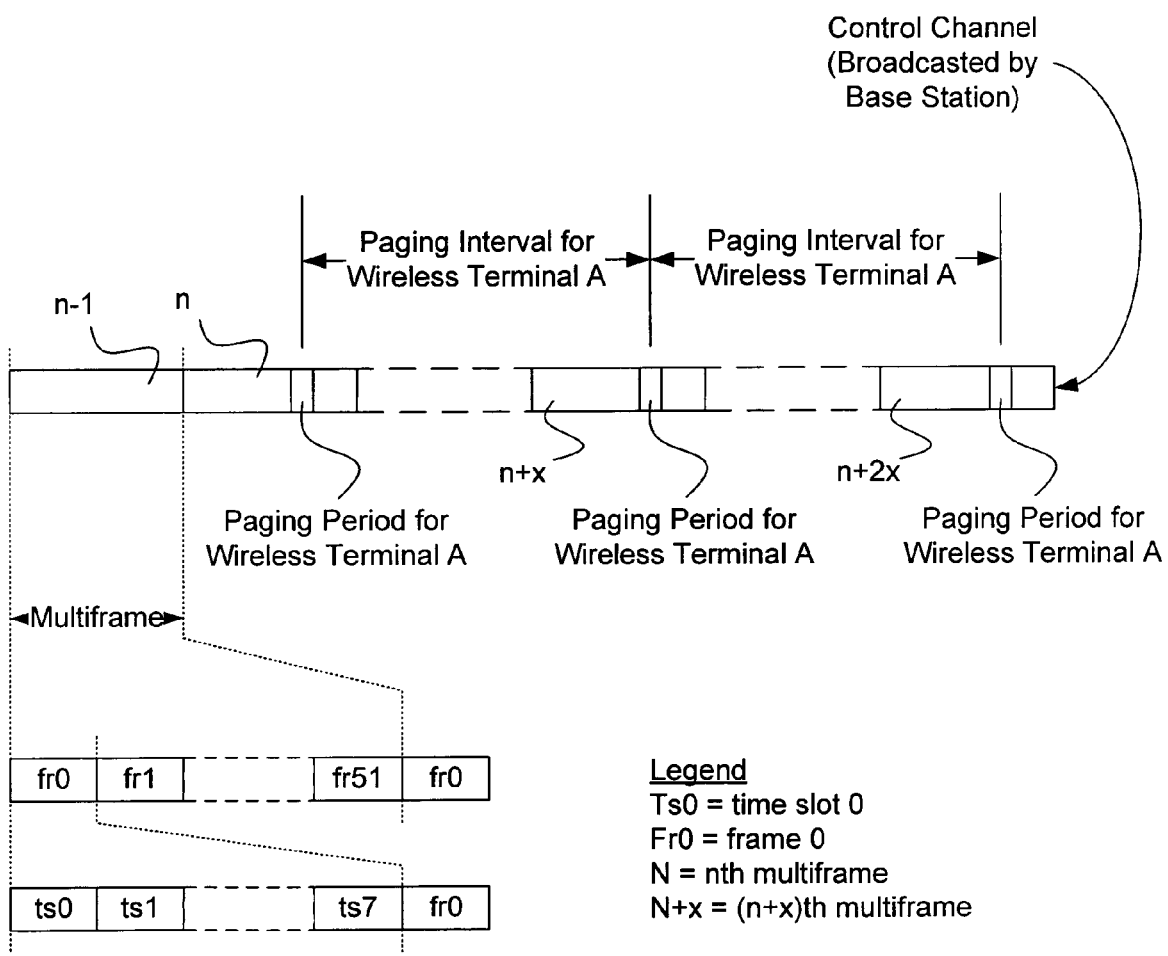
FIG. 3 illustrates an embodiment of the paging method used in existing cellular networks.

This method is described in FIG. 3.

A carrier frequency is divided into time-slots and these slots are grouped into frames. In this specific example, eight time-slots are grouped into one frame. In FIG. 3, the time slots are numbered ts0 to ts7 (the sequence repeats), and frames are number fr0 to fr51 (the sequence repeats). 52 frames, numbered fr0 to fr51, are grouped into a multi-frame.

For a specific Wireless Terminal, say Wireless Terminal A, the cellular network schedules a page only at a particular frame within a specific multiframe, and only once in every so multiframes. The exact instant of the paging period is derived using the Wireless Terminal Identification number and certain broadcasted parameters from the Cellular Network; the interval between pages is derived in some embodiments solely from certain broadcasted parameters from the cellular network. The algorithm is independently run at the Cellular Network (Base Station System) and at the Wireless Terminal so both can know the correct paging instant.

In a typical cellular system, the paging period and paging interval, shown in FIG. 3, are on the order of few milliseconds and few hundred milliseconds, respectively. This present cellular system method does not allow for the paging interval to be higher than a few seconds. This design is suitable for real-time communications—that is, whenever a Wireless Terminal has to be reached for communication, it can be reached within seconds.

The present invention proposes a novel method and system to accomplish paging of Wireless Terminals without requiring changes to the existing wireless networks when supporting non-real-time applications. This paging method has two tiers: tier-1 divides the time into a Paging Window and a Dormant Window. It uses the Current Time, the Wireless Terminal Identification number, and a certain broadcasted Parameter as factors to derive the duration and instants of the Paging Window and the Dormant Window. The Current Time is obtained by the Wireless Terminal and the Server from the same time reference. By independently running the same algorithm, both the Wireless Terminal and the Server are able to have a synchronized Paging Window and Dormant Window. Within the Paging Window, tier-2 paging is used; the tier-2 paging method is the same as whatever paging method is employed in a given cellular network unmodified. During the Dormant Window, the Wireless Terminal consumes very little power by disabling a majority of its circuitry (except for circuitry used to maintain its internal clock/timers and to monitor external interrupts). This paging method allows for a Paging Windows to be a few seconds, while the Dormant Window can be as long as many hours. This allows for a substantial reduction in the overall power consumption. However, the larger the Dormant Window the slower would be the response time to page and the received response from the Wireless Terminal (which is okay for non-real-time applications).

Figure 5:
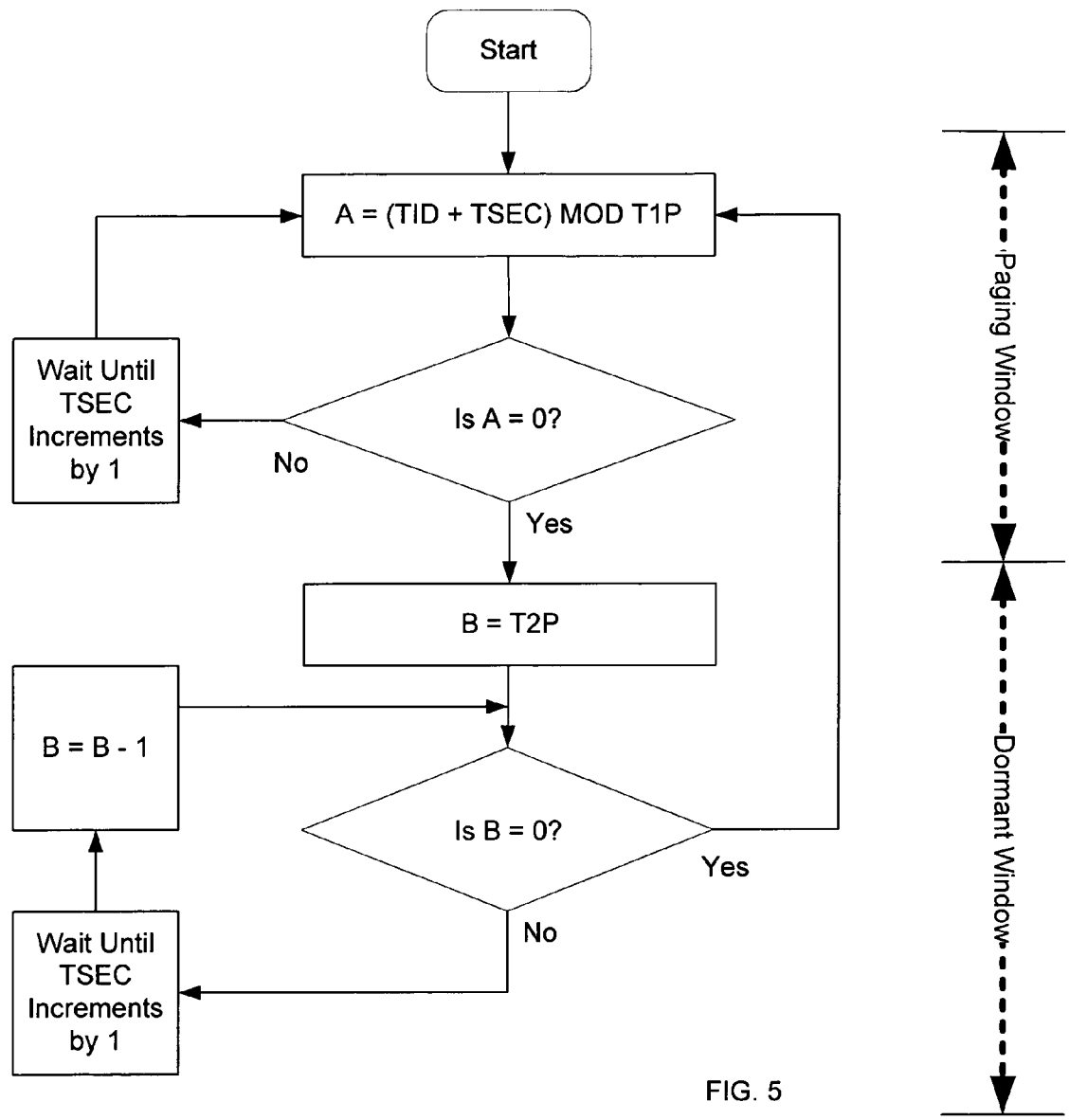
FIG. 5 illustrates an embodiment of a process for the use of time and Wireless Terminal Identification Number to create Paging and Dormant Windows.

This method also distributes the page load on the cellular network uniformly over time. When there are a large number of Wireless Terminals served, the page going to different Wireless Terminals appears to occur at random instants as far as Cellular Network is considered. This maximizes the total number of Wireless Terminal supported over a given cellular network capacity for paging load. A flow chart describing this method in detail is included (FIG. 5).

A system that can be overlaid on the existing cellular system to implement the above methods is proposed. It consist of a Server connected to the cellular network and a Wireless Terminal, both having reference time from the same source. The source can be GPS receiver or Network Time obtained through NTP.

The ratio of Paging Window to Dormant Window determines the overall power consumption. The smaller the ratio, the lower the power consumption. One way to reduce power consumption is to increasing size of Dormant Window (which increases the response time); the other is to reduce the Paging Window. When a Wireless Terminal wakes-up from dormant mode, it needs to listen and synchronize to the control channel of the cell within which the Terminal presently resides. Since the Dormant Window can be a long period of time, the Wireless Terminal could have moved multiple cells away during this period. A method is proposed to shorten the mean time it takes for the Wireless terminal to "search, find and synchronize" with the cell-site in which the Terminal presently resides. The method relies on the fact that the Wireless Terminals tend to reside within certain geographical areas most of the time, and it is more likely to have moved a short distance. The proposed quick search method leverages these characteristics. When this method does not find the control channel, a more exhaustive traditional search for control channel is performed.

System Description

An exemplary telephone system in which the present invention is embodied is illustrated in FIG. 1. The system consists of a Server and Wireless Terminals connected via a cellular communication system. Examples of cellular communication systems are GSM/GPRS/EDGE or CDMA or WCDMA.

In FIG. 1, the Server can be connected to one of the following elements in the cellular network: in the GSM/GPRS network it can be connected to the SGSN (Serving GPRS Service Node) or GGSN (Gateway GPRS Service Node) or BSC (Base Station Controller); in the CDMA network it can be connected to PDSN (Packet Data Service Node) or BSC (Base Station Controller); in the UMTS (Universal Mobile Telecommunications System) network it can be connected to SGSN, GGSN or RNC (Radio Network Controller). The server may also optionally have a GPS receiver to receive a reference time from the GPS Satellites to which the internal clock may be aligned.

The Wireless Terminal consists of a cellular modem and a processor. The Wireless Terminal may be battery powered. It is able to receive service from the cellular network whenever it is within the coverage area of an authorized cellular service provider. The Wireless Terminal has an internal time clock. The Wireless Terminal may also optionally have a GPS receiver to receive a reference time from the GPS Satellites to which the internal clock may be aligned.

The Server and the Wireless Terminal maintain internal clocks that are synchronized periodically. There are many ways to achieve synchronization. Examples are: (i) both the Server and the Wireless Terminal independently receive clock from the same source such as GPS Satellites, (ii) both the Server and the Wireless Terminal receive clock from the Internet using NTP (Network Time Protocol RFC-1305 is a commonly used Internet time protocol.), and (iii) the Server sends the time to the Wireless Terminal.

The proposed System does not require modification to cellular network paging protocols. The Wireless Terminal operates as a normal cellular terminal when in traffic mode—i.e. when it is in data transfer or voice communication modes. However in standby mode, the operation is modified as per the methods described below in order to significantly improve standby time by decreasing the power consumption, when the terminal is used for non-real-time applications.

Method Description

The method is described in three parts: (i) the overall paging method proposed, (ii) an example algorithm to implement the proposed method and achieve paging load distribution on the cellular network, and (iii) a method to short the time required for the Wireless Terminal to acquire a control channel when it comes out of long Dormant Window periods.

Figure 2:
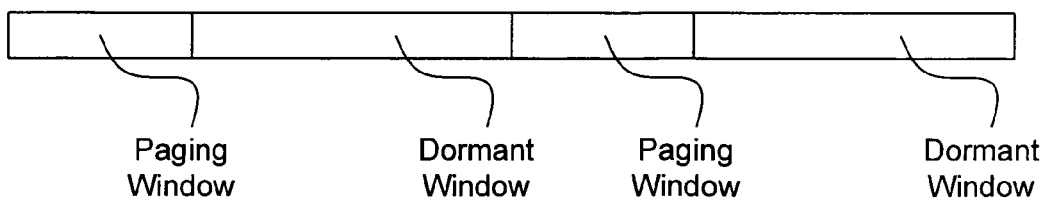
FIG. 2 illustrates an embodiment of tier-1 paging.
Figure 4:
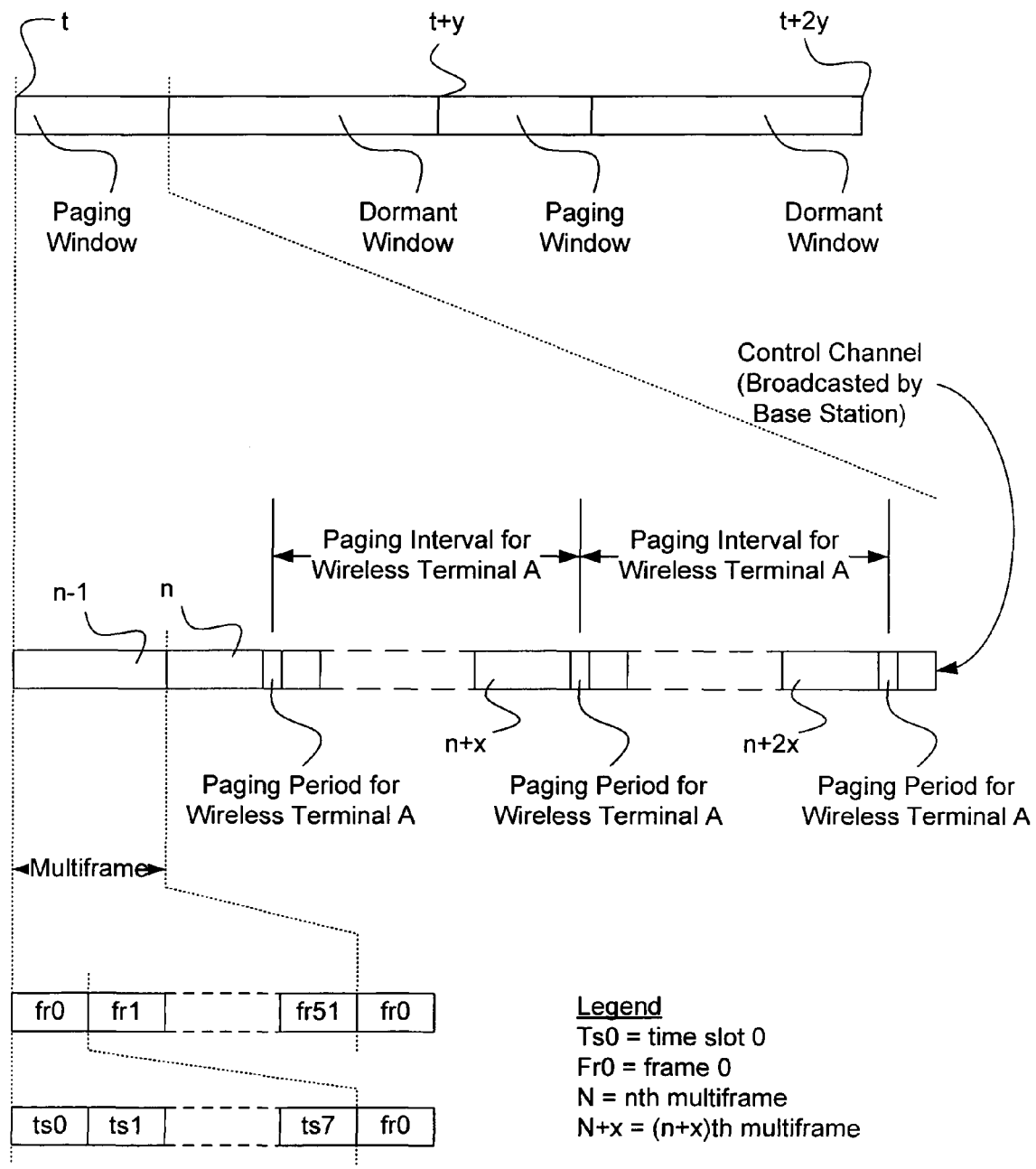
FIG. 4 illustrates an embodiment of paging.

Part 1: Overall Paging Method:

The present invention proposes a novel method and system to accomplish paging of Wireless Terminals without requiring changes to the existing wireless networks when supporting non-real-time applications. The paging method proposed has two hierarchies. Tier-1 divides the time into Paging Windows and Dormant Windows as shown in FIG. 2, and Tier-2—which is the existing cellular paging methods—are employed within the Paging Windows. This two-tier arrangement is shown in FIG. 4.

The Server and Wireless Terminal independently run the same algorithm and arrive at the same Paging Window and Dormant Window times, and hence always stay synchronized.

Part 2: Example Implementation of the Paging Method:

The salient feature of this algorithm is to use the Current Time and Wireless Terminal Identification Number as factors in deriving the Paging Window and Dormant Window. In addition to these two factors, the Server may also transmits two parameter called Tier-1 Period (T1P) and Tier-2 Period (T2P), that allows the variation of the length of the Dormant Window and the Paging Window durations anytime from the central Server.

An example implementation of this algorithm is described in FIG. 5.

Variable A is computed using the Wireless Terminal Identification number (TID), the Current time in Seconds (TSEC) and the Tier-1 Period (T1P). Variable A is the result of a modulo operation on the sum of TID and TSEC. This operation yields a number between 0 and (T1P-1). After every operation Variable A is checked to see if its value is 0, if not the operation is repeated after a second, when TID would have incremented by 1. TID itself will range from 0 to 23*60*60+59*60+59=86,399. Using a modulo operation to compute Variable A, accomplishes two objectives: (i) it establishes the Tier-1 periodicity and (ii) more importantly it makes the start of the page window to be different instants for different Wireless Terminals (an effect achieved by adding the TID to the TSEC, before the modulo operation). This makes the page for different Wireless Terminals to arrive at what appears to be random time instants to the cellular network. This distribution of page load over time is essential to maximize the use of given paging capacity of the cellular network.

Whenever Variable A reaches zero, a second procedure is invoked: B is initially set to T2P and is decremented once every second until it reaches zero. A reaching zero marks the end of the Dormant Window and the Paging Window begins. When B reaches zero, the Paging Window ends and the Dormant Window begins. And the process is perpetual.

The Wireless Terminal operates in two modes: Traffic mode and Standby mode. During Traffic mode, the Wireless Terminal is in an active voice or data communication session. This mode is unaffected by the proposed method. During Standby mode the Wireless Terminal is either in the Dormant Window or in the Paging Window. For the period of the Dormant Window, the Wireless Terminal is in a deep sleep mode: only the time clock, the external interrupt monitoring and the timers are running. Therefore, the power consumption during the Dormant Window is extremely small.

Part 3: Shortening the Paging Window

The net power consumption in Standby mode depends on the ratio of the Paging Window to the Dormant Window. A smaller ratio means less power consumption and longer the battery life. This ratio can be made smaller by increasing the Dormant Window, which has the effect of increasing the response time. For example, if the Dormant Window is set to be one hour for a specific Wireless Terminal, then for a far end that wants to send a page to that Wireless Terminal, the page may have to wait at the Server up to 1 hour. So depending on the demands of the application, the Wireless Terminal can be set with different T1P values from the Server.

Figure 6:
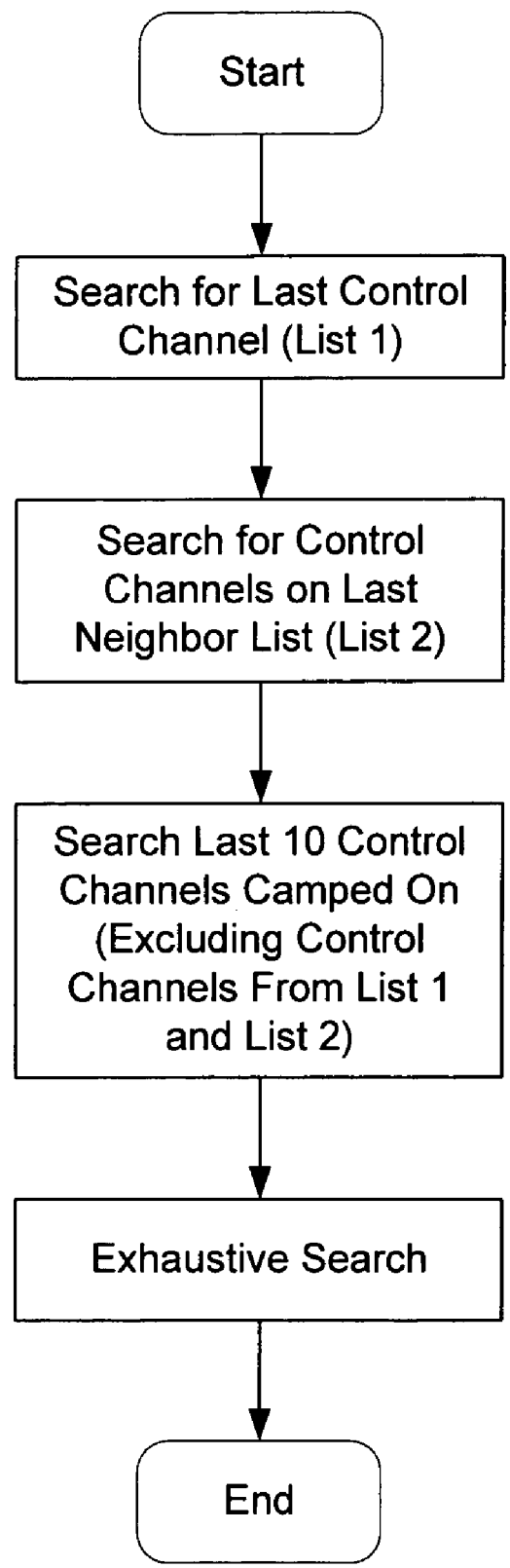
FIG. 6 illustrates an embodiment of a process for a search sequence to expedite the acquisition of control channel when the Wireless Terminal enters Paging Window after Dormant Window.

Another method to reduce power consumption is to shorten the Paging Window. The Wireless Terminal needs to wake up, search for the control channel of the cell in which it resides, synchronize, listen to the pages until the end of Paging Window, and then enter the Dormant Window (dormant mode). The Page Window is set to be sufficiently long so that all the above activities can be performed, and the Wireless Terminal can reliably receive pages sent by the Server for it. One way to shorten the Paging Window without losing any reliability is to shorten the time it takes the Wireless Terminal to search and synchronize with the control channel of the cell in which it currently resides. Existing methods in the existing mobile phones are ineffective under the proposed system because, unlike the mobile phones, Wireless Terminals can have long Dormant Windows. In today's cellular systems, the mobile phones frequently listen to the cellular network for page—typically once or twice for a page per second. The control channel in the cellular system broadcasts the control channel numbers of the surrounding cells (called Neighbor List), this is helpful for the mobile phones to switch to the new control channel when it moves from one cell to the other. However, this information may not be helpful if the Wireless Terminal awakes from a long period of being in a Dormant Window, as during this time the Wireless Terminal may have moved long distances. In order to shorten the time it would take for the Wireless Terminal to search and synchronize with the control channel, a sequence of search shown in FIG. 6 is proposed. The method relies on the fact that the Wireless Terminals tend to live in small regions most of the time. The first channel searched is the last control channel the Terminal camped on, the next is the list of Neighbor List Channels that were transmitted by the last control channel the Terminal camped on, and then the list of the last many number of channels the Terminal camped on is searched. This sequence of searching results in rapid acquisition of a control channel when the Wireless Terminal moves within a certain geographic range. When this search does not acquire a control channel more traditional exhaustive wide search methods are used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of paging for wireless networks comprising:
   synchronizing a paging window clock of a wireless terminal to a paging window clock of a server;
   deriving a paging window and a dormant window for communicating between the server and the wireless terminal based at least in part on the paging window clock of the server or the paging window clock of the wireless terminal, wherein the paging window and the dormant window are separate from a paging interval used between a base station and the wireless terminal, wherein a duration of the paging window is greater than a duration of the paging interval used between the base station and the wireless terminal, and wherein a duration of the dormant window is greater than the duration of the paging interval used between the base station and the wireless terminal;
   during the paging window:
      sending a page from the server to the wireless terminal in the event that the server is indicated to send the page to the wireless terminal;
      waking up circuitry of the wireless terminal to receive and respond to the page in the event that the page is transmitted to the wireless terminal in a paging period during the paging window;
      receiving the page from the server at the wireless terminal; and
   during the dormant window:
      causing the circuitry of the wireless terminal to sleep even during times that correspond to paging slots for the wireless terminal between the base station and the wireless terminal;
   wherein the paging window has a duration at least as long as a duration from a start of a first paging slot to an end of a second paging slot between the wireless terminal and the server such that the paging window overlaps at least one paging slot between the wireless terminal and the base station.

2. A method as recited in claim 1, wherein synchronizing the paging window clock of the wireless terminal to the paging window clock of the server comprises the server sending a synchronizing signal to the wireless terminal.

3. A method as recited in claim 1, wherein synchronizing the paging window clock of the wireless terminal to the paging window clock of the server comprises synchronizing the clock of the server to an external time reference and synchronizing the clock of the wireless terminal to the external time reference.

4. A method as recited in claim 1, wherein synchronizing the paging window clock of the wireless terminal to the paging window clock of the server comprises synchronizing the paging window clock of the server to an external time reference and synchronizing the paging window clock of the wireless terminal to the external time reference wherein the external time reference comprises a GPS time reference.

5. A method as recited in claim 1, wherein synchronizing the paging window clock of the wireless terminal to the paging window clock of the server comprises synchronizing the paging window clock of the server to an external time reference and synchronizing the paging window clock of the wireless terminal to the external time reference wherein the external time reference comprises Internet time via NTP protocol.

6. A method as recited in claim 1, wherein the received page from the server is based on the GSM/GPRS paging method.

7. A method as recited in claim 1, wherein the received page from the server is based on the CDMA paging method.

8. A method as recited in claim 1, wherein the received page from the server is based on the WCDMA paging method.

9. A method as recited in claim 1, wherein deriving the paging window and the dormant window can be changed by the server.

10. A method as recited in claim 1, wherein finding the control channel for the cellular network by the wireless terminal includes searching a last control channel camped on.

11. A method as recited in claim 1, wherein finding the control channel for the cellular network by the wireless terminal includes searching a list of most recent control channels.

12. A method as recited in claim 1, wherein finding the control channel for the cellular network by the wireless terminal includes searching a last neighbor control channel list.

13. A method as recited in claim 1, wherein during the dormant window the wireless terminal conserves power by one or more of the following: shutting down part the wireless terminal's circuitry, running circuitry to maintain the internal wireless terminal window clock, and running circuitry to respond to an interrupt.

14. A system for paging for wireless networks comprising:
   a time reference;
   an internal server paging window clock;
   an internal wireless terminal paging window clock;
   a processor of a server for synchronizing the internal server paging window clock with the time reference and for deriving a paging window and a dormant window based at least in part on the internal server paging window clock or the internal wireless terminal paging window clock, wherein the paging window and the dormant window are separate from a paging interval used between a base station and the wireless terminal, wherein a duration of the paging window is greater than a duration of the paging interval used between the base station and the wireless terminal, and wherein a duration of the dormant window is greater than the duration of the paging interval used between the base station and the wireless terminal;
   a processor of the wireless terminal for synchronizing the internal wireless terminal paging window clock with the time reference and for deriving the paging window and the dormant window;

a wireless terminal radio receiver for receiving pages from the server, wherein the wireless terminal radio receiver listens for pages only during the paging window, and wherein the wireless terminal radio receiver ignores all communication from the base station during the dormant window, including a page within a paging slot between the wireless terminal and the base station, wherein the paging window has a duration at least as long as a duration from a start of a first paging slot to an end of a second paging slot between the wireless terminal and the server such that the paging window overlaps at least one paging slot between the wireless terminal and the base station.

15. A system as recited in claim 14, wherein the time reference comprises a GPS time reference.

16. A system as recited in claim 14, wherein during the dormant window the wireless terminal conserves power by one or more of the following: shutting down part the wireless terminal's circuitry, running circuitry to maintain the internal wireless terminal window clock, and running circuitry to respond to an interrupt.

17. A system as recited in claim 14, wherein periodically synchronizing the internal wireless terminal window clock of the wireless terminal comprises the server sending a synchronizing signal to the wireless terminal.

18. A system as recited in claim 14, wherein periodically synchronizing the internal wireless terminal window clock of the wireless terminal comprises synchronizing the internal server window clock to the time reference and synchronizing the internal wireless terminal window clock to the time reference.

19. A system as recited in claim 14, wherein the time reference comprises Internet time via NTP protocol.

20. A system as recited in claim 14, wherein the received page from the server is based on the GSM/GPRS paging method.

21. A system as recited in claim 14, wherein the received page from the server is based on the CDMA paging method.

22. A system as recited in claim 14, wherein the received page from the server is based on the WCDMA paging method.

23. A system as recited in claim 14, wherein deriving the paging window and the dormant window can be changed by the server.

24. A system as recited in claim 14, wherein the wireless terminal finds a control channel for the cellular network by searching a last control channel camped on.

25. A system as recited in claim 14, wherein the wireless terminal finds a control channel for the cellular network by searching a list of most recent control channels.

26. A system as recited in claim 14, wherein the wireless terminal finds a control channel for the cellular network by searching a last neighbor control channel list.

* * * * *